United States Patent [19]

Klassen

[11] 4,401,194
[45] Aug. 30, 1983

[54] PIN GUIDE FOR SLIDING CALIPER DISC BRAKES

[75] Inventor: Horst W. Klassen, St. Sebastian, Fed. Rep. of Germany

[73] Assignee: Lucas Industries Limited, Birmingham, England

[21] Appl. No.: 236,175

[22] Filed: Feb. 18, 1981

[30] Foreign Application Priority Data

Feb. 26, 1980 [GB] United Kingdom ............... 8006339

[51] Int. Cl.³ .......................................... F16D 65/09
[52] U.S. Cl. ............................. 188/73.44; 188/73.45
[58] Field of Search ............... 188/72.4, 73.32, 73.33, 188/73.39, 73.43, 73.44, 73.45

[56] References Cited

U.S. PATENT DOCUMENTS

| 3,616,877 | 11/1971 | Collins | 188/73.45 |
| 3,805,925 | 4/1974 | Schoenhenz | 188/73.45 |
| 4,049,086 | 9/1977 | Rath | 188/73.45 |
| 4,053,031 | 10/1977 | Thioux | 188/73.32 |
| 4,121,698 | 10/1978 | Baum | 188/73.45 |

FOREIGN PATENT DOCUMENTS

| 2849952 | 5/1980 | Fed. Rep. of Germany . |
| 2931216 | 3/1981 | Fed. Rep. of Germany ... 188/73.44 |
| 55-51131 | 4/1980 | Japan ............................... 188/73.45 |
| 1271609 | 4/1972 | United Kingdom . |

Primary Examiner—Douglas C. Butler
Assistant Examiner—R. R. Diefendorf
Attorney, Agent, or Firm—Scrivener, Clarke, Scrivener and Johnson

[57] ABSTRACT

The present specification discloses a pin slider disc brake comprising a torque-taking member and a caliper member, the members being slidable relative to one another by at least one pin connection. Each pin connection comprises an elongate, preferably cylindrical, pin guide which can be made of a corrosion-resistant material, the pin guide being detachably secured to, for example, the torque-taking member. The pin guide has a blind bore extending therethrough, in which a pin secured to the caliper member can freely slide, and the pin guide is so mounted to present an external surface which acts as a friction pad support surface. Thus, the pin guide can be relatively cheaply manufactured of corrosion-resistant material and simply replaced in the event of damage or wear.

13 Claims, 5 Drawing Figures

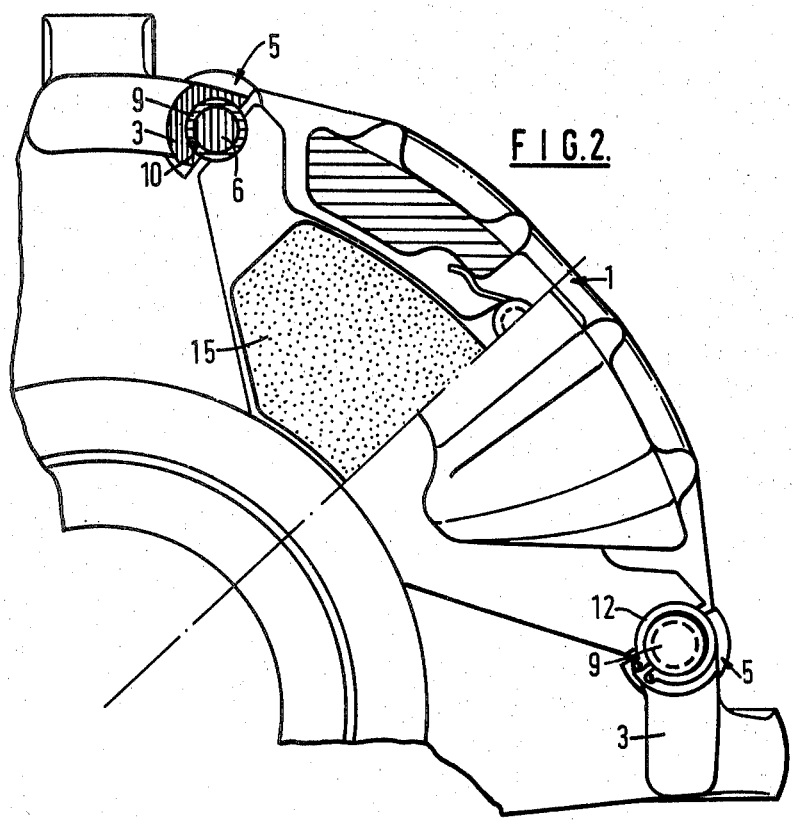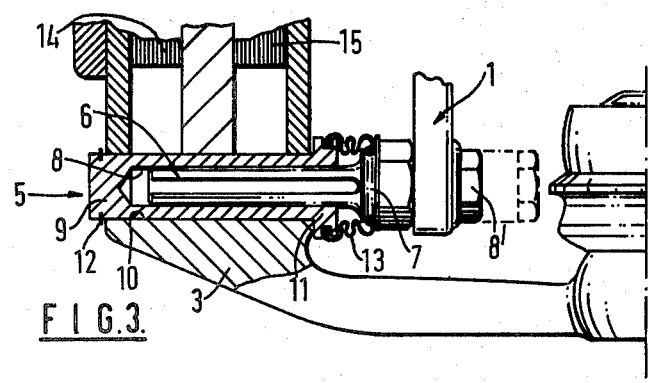

PIN GUIDE FOR SLIDING CALIPER DISC BRAKES

DESCRIPTION

The present invention relates to a pin sliding caliper disc brake for use in motor vehicles.

In known pin sliding caliper disc brakes, the brake comprises a torque taking member and a caliper member, the caliper member and torque taking member being slidably interconnected by at least one pin so that movement of the caliper member relative to the torque taking member can apply friction pad assemblies to opposite sides of a rotating disc. Certain such brakes provide two pins fixed on the caliper member, the pins engaging in respective bores in the torque taking member. To facilitate efficient sliding operation of the brake, the torque taking member should be made of a corrosion resistant material so that the bores within which the pins engage, are not affected by weathering. It is however expensive to manufacture the torque taking member from a corrosion resistant material especially if the torque taking member is part of a stub axle assembly.

It is also necessary in pin sliding disc brakes, to make sure that the friction pad assemblies are freely slidably supported. This is preferably facilitated by the use of corrosion resistant material for the pad guides. However, as the pad guides are usually formed integrally with the caliper and/or torque taking member, such a construction is clearly expensive.

Constructions described in British Patent Specification No. 1271609 and German Offenlegungschrift No. 2849952 are representative of attempts to guide the caliper member as well as the friction pad assemblies by an assembly located between the two, whereby only a relatively small non-corrosion resistant part or assembly could be utilised.

In British Patent Specification No. 1271609 a cylindrical sleeve grips the torque taking member by means of interengaging transverse slots in the sleeve, and projections and grooves on the torque taking member, and provides a support surface for the caliper member to slide upon. This surface is however exposed to the weather. To support the friction pad assemblies a pin member passes through the sleeve and is supported on resilient bushes in the sleeve, and parts of the friction pad assemblies extending through slots in the sleeve to engage the pin member. The bushes assist in damping vibrations experienced by both pads and caliper member. However, the sleeve/pin member assembly, is quite complex with its various slots and is not designed to take the majority of the drag forces from the friction pad assemblies, the bulk of the drag being taken through the caliper member to the torque taking member via the interface therebetween. Thus due to this interface the caliper and torque taking member should be both of corrosion resistant material to facilitate sliding therebetween. However, such a construction is again expensive.

In German Offenlegunschrift No. 2849952, a single pin screwed into the torque taking member provides a sliding surface at one end to support the caliper member, and a surface at the other end for supporting the friction pad assemblies. This construction has the disadvantage that the sliding surface for the caliper member is exposed to weathering, but it is conceivable that this construction could be used with a pin made of a corrosion resistant material. However a disadvantage arises in the fact that guide pins in brakes are usually made of a metal having a certain natural resiliency whereas corrosion resistant metals are usually harder than normal steels, and the use of such harder corrosion-resistant metals could lead to the pin being less reliable in use and more susceptible to failure under any shock loads which may be exerienced during operation of the brake. If the pin were alternatively made of a plastics material, thus being inherently non-corrosive, there is the further disadvantage that the caliper supporting portions may fracture in the event of any spurious shock loads transferred through the caliper.

An aim of the present invention is therefore to provide a disc brake wherein the brake is relatively cheap to manufacture whilst it is possible for the pin and pad guides to be of a requisite corrosion-resistant material.

According to the present invention there is provided a disc brake comprising a torque taking member and a caliper member, the caliper member being slidable relative to the torque taking member by means of at least one pin connection wherein the pin is secured to one of said members and is axially slidably engaged in a bore in a pin guide which is secured to the other of said member, the pin guide also providing a friction pad assembly support surface.

Thus by virtue of the present invention the pin guide may be advantageously manufactured from a corrosion-resistant material and provide an internal surface for supporting a sliding guide pin, and an external surface for supporting at least one friction pad assembly.

In one embodiment of the present invention the disc brake utilises two spaced apart pins to provide the sliding connection between the caliper member and the torque taking member, the pins being secured to the caliper member. The respective pin guides are preferably cylindrical members each having an axially extending blind bore which is of sufficient diameter to allow one of the pins to slide therein, the pin guides being located in grooves in the torque taking member. These grooves have walls which circumscribe an arc greater than that of a semi-circle and of a diameter corresponding to the external diameter of the cylindrical pin guides. Thus the pin guides are retained in the grooves in the caliper member. Preferably a shoulder is provided at one end of each pin guide, this shoulder together with a circlip at the other end of the pin guide preventing the pin guide from being axially displaced from its groove in the caliper member.

Thus it will be appreciated that only the pin guides need to be manufactured from a corrosion-resistant material to facilitate smooth sliding at all times, the remainder of the caliper member being constructed of any other suitable, cheaper material.

The external surfaces of the pin guides support and act as guide surfaces for the friction pad assemblies of the brake, the corrosion-resistant nature of the pin guide material providing also for an efficient pad guide. Thus, if the pad guides are overloaded or simply wear, it is a simple matter to replace the pin guides i.e. pad guides, without having to replace the complete torque taking member which might mean the replacement of the complete stub axle assembly.

In an alternative embodiment of the present invention the pin guides are not retained in mating grooves in the torque taking member, but are each screwed into suitably arranged and threaded apertures in the torque taking member.

Further, the pin guides external configuration may be varied to present whatever transverse cross-section is required e.g. square, hexagonal or triangular. For example, the external surface of a cylindrical pin guide may have reduced diameter portions to facilitate the removal of friction pad assemblies from the brake and/or to cater for a larger disc.

Thus the present invention provides a cheap method of providing suitable pin guiding surfaces in a sliding caliper disc brake, the pin guides additionally providing suitable pad supporting and guiding surfaces.

The present invention will now be further described, by way of example, with reference to the accompanying drawings, in which:

FIG. 2 is a partially cutaway side view of part of the disc brake of FIG. 1;

FIG. 3 is a cross-sectional view of the lower part of the brake as shown in FIG. 2;

Figure 1:
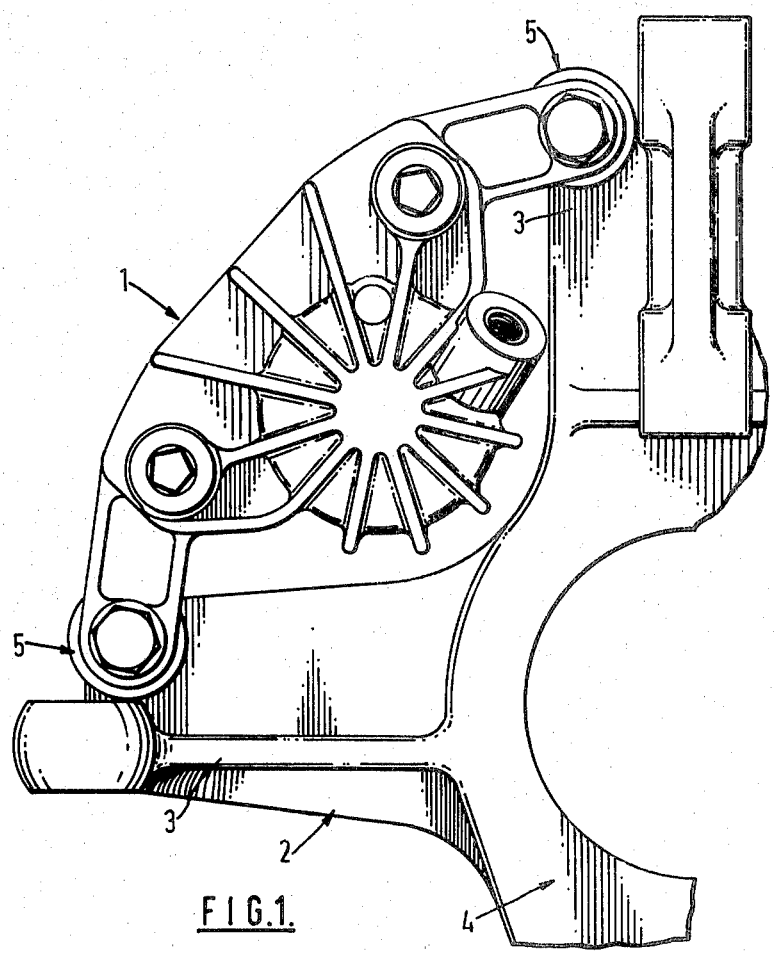
FIG. 1 shows one embodiment of a disc brake constructed according to the present invention.

One embodiment of a disc brake constructed according to the present invention is illustrated in FIGS. 1 to 3. The brake basically comprises a caliper member 1 and a torque taking member 2, the arms 3 of the torque taking member being an integral part of stub axle assembly 4.

As can best be seen from FIG. 3, the caliper member 1 is connected to the arms 3 of the torque taking member 2 by two sliding pin connections generally designated 5. Each sliding pin connection 5 comprises an elongate pin member 6 which has a uniform dimension for the majority of its length and is enlarged at one end 7, the enlarged end 7 incorporating an axially extending bore (not shown) into which a bolt 8' is screwed to thus secure the pin member 6 to the caliper member 1. The pin member 6 slidably engages in a complementary blind bore 8 in a cylindrical pin guide 9 which is secured in a groove 10 in an arm 3 of the torque taking member. The groove 10, in transverse cross-section, circumscribes an arc greater than that of a semi-circle and hence the pin guide 9 which is of substantially complimentary diameter to that of the groove, can be axially slid into the groove but cannot fall out of the open part of the groove wall. To axially retain the pin guide 9 in groove 10, the open end of the guide is provided with an enlarged diameter shoulder 11 and a circlip 12 is engaged on the other end of the pin guide 9 once the guide has been engaged in groove 10. In use a rubber boot 13 interconnects shoulder 11 and enlarged end 7 of pin member 6 so that the sliding surface of the pin member 6 is protected from the weather.

Thus the cylindrical pin guide 9 can be made of a relatively expensive corrosion-resistant material whilst the remainder of the torque taking member and stub axle assembly can be made of any suitable cheaper material. Further, in the event of wear, the pin guides 9 can be replaced rather than having to replace the whole stub axle assembly.

In the embodiment of FIGS. 1 to 3, as best seen in FIGS. 2 and 3, the pin guides 9 also act as supports for friction pad assemblies 14 and 15, the backing plates of each assembly engaging on the part of the cylindrical pin guides 9 projecting from the grooves 10. Thus, in the case of overload damaging these pad guides i.e. pin guides 9, or in the case of wear, the cylindrical pin guides can be relatively cheaply replaced, it being necessary for the pad guides to also be corrosion-resistant to ensure continued smooth operation.

Figure 4:
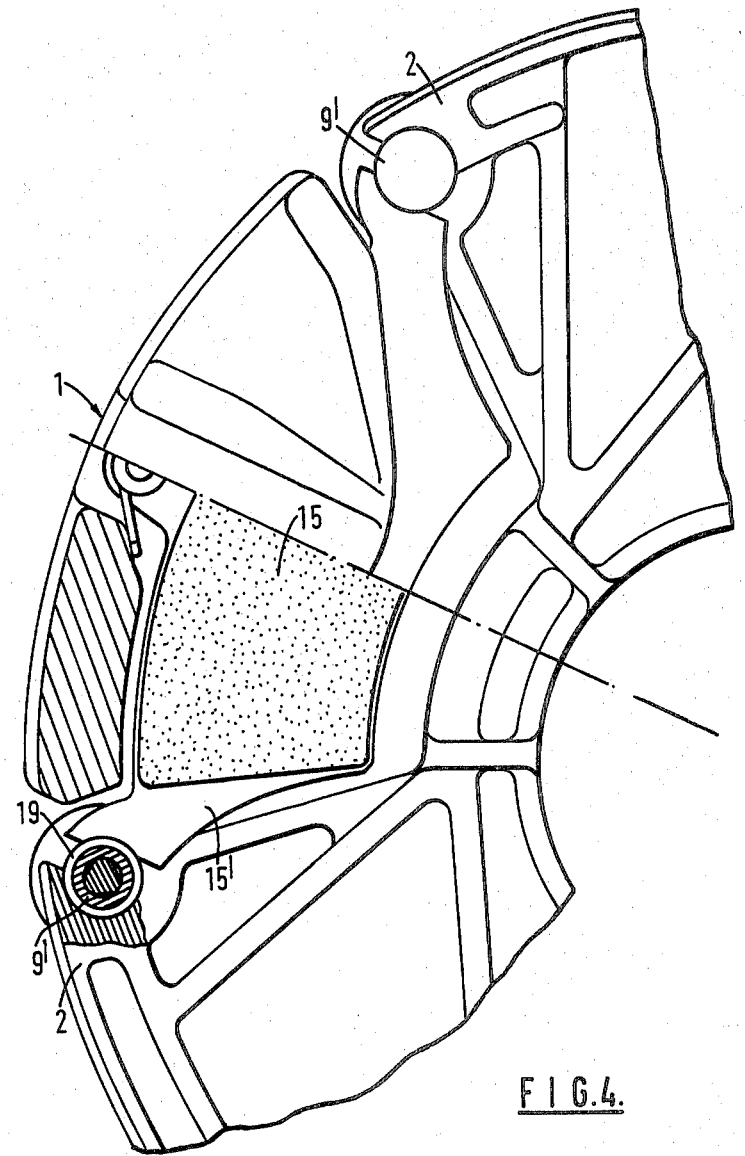
FIG. 4 is a partially cutaway side view of another embodiment of the present invention.
Figure 5:
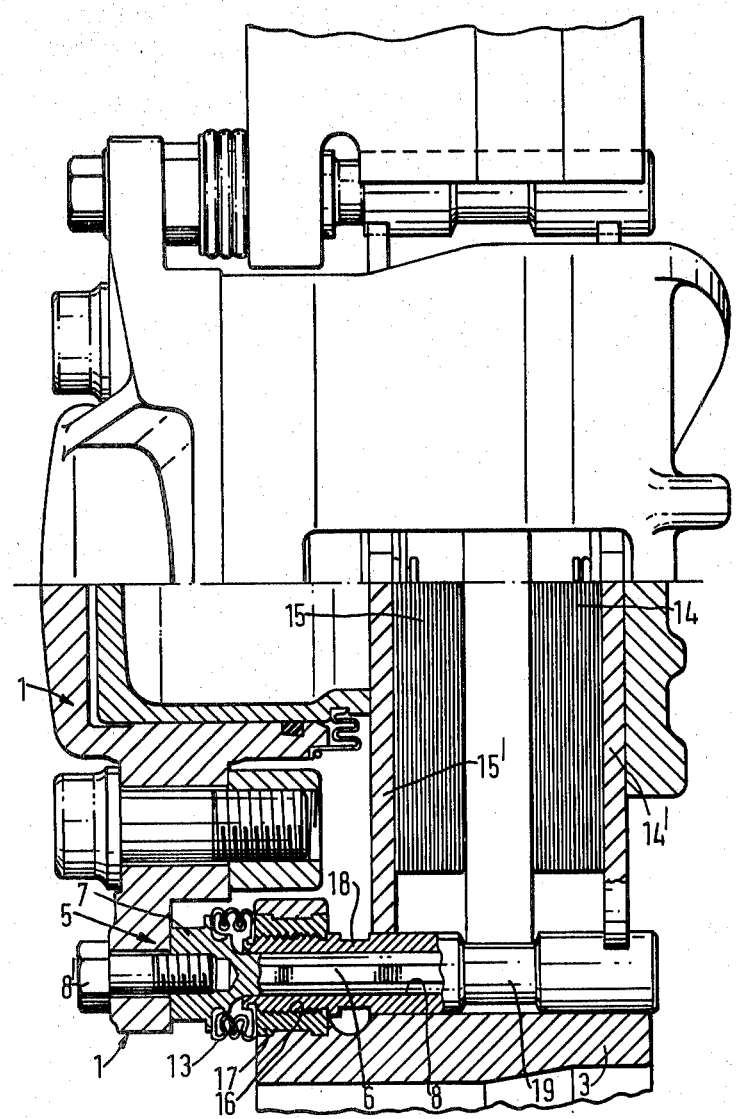
FIG. 5 is a partially cutaway plan view of the brake of FIG. 4.

The embodiment of the present invention illustrated in FIGS. 4 and 5 is similar to that of FIGS. 1 to 3 and the same reference numerals are therefore used in FIGS. 4 and 5 to identify parts equivalent to those of FIGS. 1 to 3.

The difference between the embodiment of FIGS. 4 and 5, and the embodiment of FIGS. 1 to 3 lies in the design of the pin guides 9'.

The pin guides 9' are simply supported in grooves in the torque taking member and are both retained in the grooves and secured against axial movement by one end of each pin guide 9' being screwed into a threaded aperture 16 provided in an ear 17 which projects from an arm 3 of the torque taking member 2. Otherwise the pin connections 5 operate as per FIGS. 1 to 3.

Also, as in the embodiment of FIGS. 1 to 3, the pin guides 9' act as supports and guides for friction pad assemblies 14 and 15 and an annular groove 18 is provided in the external surface of the pad guides i.e. pin guides 9', to facilitate removal of friction pad assembly 15, groove 18 being provided towards the actuator/caliper end of pin guide 9' and enabling the side edge of backing plate 15' to pass therethrough. The side edge of backing plate 14' can be disengaged from guide 9' by axial movement of pad assembly 14 relative to guide 9'. A wide groove 19 in the external surface of the pin guides 9' allows a larger than normal disc to be utilised with the brake.

Whilst the above two embodiments utilise basically cylindrical pin guides 9, 9' it will be appreciated that any design of pin guide may be utilised. For example, the pad/pin guide could conveniently be manufactured from stock hollow bar suitably machined and plugged. Within the present invention the pin member 6 may also have any desired transverse cross-section provided it mates in a suitable member with a bore in a pin guide.

A further alternative is that the pin 6 need not be of a two-part construction but may be secured directly to the caliper member by, for example, a threaded connection.

The main criterion of the present invention is that relatively expensive corrosion resistant materials may be used solely for the pin guides which also can act as pad guides, so that the overall cost of the brake is not too adversely affected. Furthermore since the pad/pin guide is supported over substantially all of its bearing length by the torque taking member it is envisaged that the pad/pin guides could advantageously be manufactured from a suitable plastics material.

I claim:

1. A disc brake comprising a torque-taking member, a caliper member, and a friction pad assembly, the caliper member being slidable relative to the torque-taking member by means of at least one pin connection, each pin connection having a pin which is secured to one of said members and is axially slidably engaged in a bore in a pin guide secured to the other of said members, the pin guide also providing a support surface for said friction pad assembly, said pin guide being separable from said torque-taking and caliper members and at all times being interposed between said pin and said other of said members throughout the range of movement of said pin relative to the other of said members.

2. A disc brake according to claim 1, wherein the pin guide is detachably secured to one of said members.

3. A disc brake according to claim 1, wherein the pin guide is an elongate member secured in a groove in one of said members.

4. A disc brake according to claim 3, wherein the pin guide is cylindrical and the said groove has a wall which circumscribes an arc greater than that of a semi-circle and of a diameter corresponding to the external diameter of the cylindrical pin guide.

5. A disc brake according to claim 4, wherein a shoulder is provided at one end of the pin guide and a circlip at the other end, to prevent the pin guide from being axially displaced from the groove.

6. A disc brake according to claim 4 or 5, wherein the exposed external surface of the pin guide acts as said support surface for the friction pad assemblies.

7. A disc brake as claimed in any one of claims 1 to 5, in which the pin guide has a blind bore for slidably receiving the pin.

8. A disc brake as claimed in any one of claims 1 to 5, wherein the pin guide is made of a corrosion-resistant material.

9. A disc brake as claimed in any one of claims 1 to 5, wherein each pin guide is secured to the torque-taking member.

10. A disc brake according to claim 1, wherein the pin guide is provided with a screw thread and is screwed into a threaded aperture in one of said members, the exposed external surface of the pin guide forming a friction pad support surface and the bore in the pin guide slidably receiving said pin secured to the other of said members.

11. A disc brake according to claim 1, wherein the pin guide is elongate and has reduced transverse dimension regions to facilitate the removal of friction pad assemblies from the brake and/or to cater for a larger disc.

12. A disc brake according to claim 1 wherein said friction pad assembly is at all times in direct engagement with the support surface of said pin guide.

13. A disc brake comprising a torque-taking member, a caliper member, and a friction pad assembly, the caliper being slidable relative to the torque-taking member by means of two pin connections in each of which a pin is secured to one of said members and is axially slidably engaged in a bore in a pin guide secured to the other of said members, the external surfaces of the pin guides providing support surfaces for said friction pad assembly, each of said pin guides being separable from said torque-taking and caliper members and at all times being interposed between said pin and said other of said members throughout the range of movement of said pins relative to the other of said members.

* * * * *